United States Patent [19]

Kaneko et al.

[11] 4,420,397
[45] Dec. 13, 1983

[54] METHOD OF TREATING WASTE LIQUORS CONTAINING PHENOL

[75] Inventors: Yasuyuki Kaneko, Nagoya; Masao Itoh, Anjyo; Shinji Takahashi, Chigasaki, all of Japan

[73] Assignee: Nagoya University, Nagoya, Japan

[21] Appl. No.: 331,808

[22] Filed: Dec. 17, 1981

[30] Foreign Application Priority Data

Dec. 19, 1980 [JP] Japan ................................ 55-180020
Dec. 23, 1980 [JP] Japan ................................ 55-182318

[51] Int. Cl.³ .......................... C02F 3/34; C12N 1/14; C12R 1/645
[52] U.S. Cl. .................................. 210/611; 210/612; 210/615; 210/909; 435/254; 435/262; 435/911
[58] Field of Search ................ 210/610, 611, 615–619, 210/909, 612, 150, 151; 435/262, 254, 911

[56] References Cited

U.S. PATENT DOCUMENTS

| | | | |
|---|---|---|---|
| 3,769,164 | 10/1973 | Azarowicz | 435/911 |
| 4,169,049 | 9/1979 | Salkinoja-Salone | 210/909 |
| 4,344,848 | 8/1982 | Hakulinen | 210/909 |
| 4,352,886 | 10/1982 | Pillis et al. | 210/909 |

FOREIGN PATENT DOCUMENTS

| | | | |
|---|---|---|---|
| 2311759 | 12/1976 | France | 210/909 |
| 54-71856 | 6/1979 | Japan | 210/611 |
| 499227 | 7/1976 | U.S.S.R. | 210/909 |

*Primary Examiner*—Benoit Castel
*Attorney, Agent, or Firm*—Burns, Doane, Swecker & Mathis

[57] ABSTRACT

Waste liquors containing high concentration of phenol and waste liquors containing methanol and formaldehyde in addition to phenol can economically be treated by a microorganism of geneus Aureobasidium to prevent water-pollution.

23 Claims, 15 Drawing Figures

FIG_6

FIG_11

METHOD OF TREATING WASTE LIQUORS CONTAINING PHENOL

BACKGROUND OF THE INVENTION

1. Field of the Invention

The present invention relates to a method of treating waste liquors containing large amount of phenol.

The present invention further relates to a method of treating waste liquors containing methanol and formaldehyde in addition to phenol.

2. Description of the Prior Art

Usually, waste liquors discharged from phenol production industry, phenol resin or its derivative production industry, petroleum-refining industry, coal gas production industry, coke production industry, hospitals, experiment stations, laboratories and the like contain high concentration of phenols such as phenol, cresol, catechol and their derivatives. From an aspect of environmental sanitation, many towns and cities have nowadays acts or regulations to obligate ones to remove phenols for preventing environmental pollution.

The term "phenol" or "phenols" used herein means a compound or compounds selected from the group consisting of phenol, o-, m- and p-cresol, saligenine, o-, m- and p-hydroxybenzaldehyde, salicylic acid, catechol, 3-methylcatechol and 4-methylcatechol, etc.

Heretofore, in order to remove phenol from a waste liquor containing phenol, there have been proposed many methods such as solvent extraction method, activated carbon adhesion method, chemical oxidation method, incineration method, activated sludge method, etc. Though all the methods attain average level of effects, they have several problems when the amount of influent waste liquor to be treated fluctuates considerably and the waste liquor contains a high concentration such as 800–1200 ppm of phenol. The problems are illustrated as follows.

(1) In solvent extraction method, solvent is very expensive, so that operation is difficult.

(2) In activated carbon adhesion method, adhesion capacity of the activated carbon decreases rapidly. Namely, consumption of the activated carbon is very large, so that control and maintenance of this method are difficult.

(3) In chemical oxidation method, running cost is considerably large for the sake of oxidizing agents such as $H_2O_2$, $O_3$, etc.

(4) In incineration method, running cost is extremely large owing to combustion fuel.

(5) In activated sludge method, it is rather difficult to maintain the activity of acclimated microorganisms, which is weak against fluctuation in phenol concentration of an influent waste liquor to be treated. Besides, dilution of the waste liquor is essential, so that apparatus used in this method become necessarily large. Therefore, investment cost is quite expensive.

(6) In conventional activated sludge method, CN and SCN ions existing in an influent waste liquor discharged from coal gas production industry or coke production industry have to be treated or removed preliminarily.

Additionally, there are hitherto waste liquors containing high concentrations of methanol and formaldehyde in addition to phenol, such as waste liquors from phenol resin production industry etc. The three compounds have large toxicities adversely influencing upon a biological treatment of the waste liquors. For this reason, heretofore, waste liquors can be treated by activated sludge method only after dilution with a large amount of water or a complicated physical and chemical pretreatment for decreasing the toxicities of the three compounds, as described in Japanese patent application laid-open No. 62,659/79. However, the activated sludge method has disadvantages that the usage of a large amount of water for dilution results in not only extremely large amount of diluted waste liquor to be treated, but also considerably large expenditure of the water for dilution, and that the physical and chemical pretreatment necessiatates a large amount of chemicals, labor, time and a large scale of apparatus.

SUMMARY OF THE INVENTION

An object of the present invention is therefore to provide a method of treating waste liquors containing phenol, wherein the aforementioned problems and disadvantages are eliminated.

Another object of the present invention is to provide a method of treating waste liquors containing phenol, wherein the amount of water for dilution is decreased, investment cost and running cost are decreased to minimum value, fluctuation in phenol concentration of an influent waste liquor to be treated is permissible and waste liquors are treated rapidly and economically in a considerably small apparatus.

A further object of the present invention is to provide a method of treating waste liquors containing high concentrations of phenol, methanol and formaldehyde, wherein a fungus is used which is excellently capable of decomposing and assimilating phenol, methanol and formaldehyde and is able to propagate against the multiplicative adverse influences of the toxicities by the three compounds and decompose and remove the three compounds sufficiently.

A principal object of the present invention is to provide a method of treating a waste liquor containing phenol comprising: pure-culturing a fungus of *Aureobasidium pullulans* on a support soaked with a pre-culture medium to produce mold-supports masses; culturing the mold-supports masses thus obtained in a waste liquor containing phenol under aeration in a treating tank set with a filling skeleton; whereby said phenol in the waste liquor in said treating tank is decomposed and assimilated by oxidizing function of said fungi under aeration; and said fungi in the waste liquor in the treating tank is propagated under aeration so as to produce a large mold-hyphal-supports masses; and the fungal cells can easily be removed.

Another object of the present invention is to provide a method of treating a waste liquor containing phenol, methanol and formaldehyde comprising; pure-culturing a fungus of *Aureobasidium pullulans* on a support soaked with a pre-culture medium to produce mold-supports masses; culturing the mold-supports masses thus obtained in a waste liquor containing phenol, methanol and formaldehyde under aeration in a treating tank; decomposing and assimilating phenol, methanol and formaldehyde in the waste liquor in said treating tank by oxidizing function of said fungi under aeration; propagating the fungi in the waste liquor in the treating tank under aeration as to produce a large mold-hyphal-supports masses; and removing the fungal cells.

A further object of the present invention is to provide a method of treating a waste liquor containing phenol comprising: pure-culturing a fungus of *Aureobasidium pullulans* on a support soaked with a pre-culture medium to produce mold-supports masses; culturing the mold-supports masses thus obtained in a waste liquor containing phenol, methanol, and formaldehyde under aeration in a treating tank set with a filling skeleton; whereby said phenol, methanol and formaldehyde in the waste liquor in said treating tank are decomposed and assimilated by oxidizing function of said fungi under aeration; and said fungi in the waste liquor in the treating tank is propagated under aeration so as to produce a large mold-hyphal-supports masses; and the fungal cells can easily be removed.

Another objects and advantages of the present invention will become apparent from the ensuing descriptions of the specification and accompanying drawings.

Figure 1:
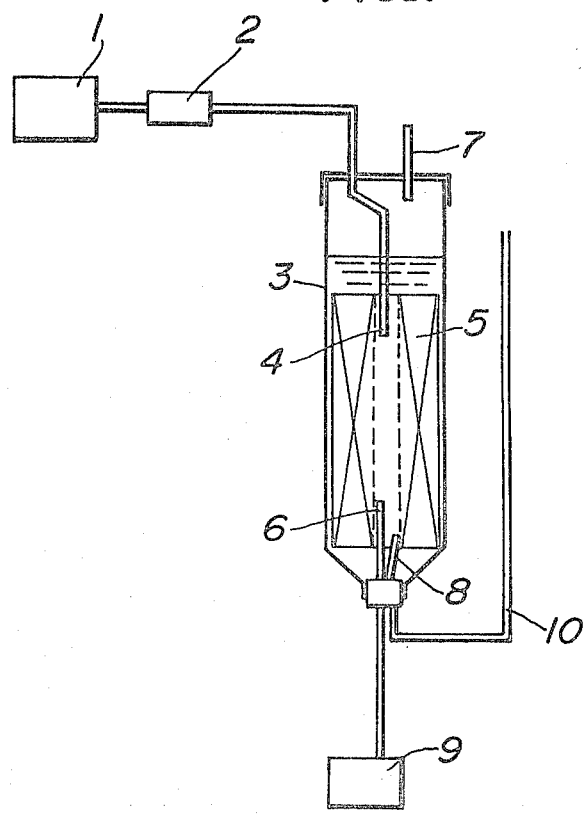
FIG. 1 is a schematic cross-sectional side view of a preferred embodiment of the apparatus used in practicing the method of the present invention.

1 . . . reservoir tank for influent waste liquor, 2 . . . peristaltic pump, 3 . . . treating tank body, 4 . . . inlet for introducing the waste liquor, 5 . . . filling skeleton, 6 . . . inlet for aeration, 7 . . . outlet for discharging aerated air, 8 . . . outlet for treated waste liquor, 9 . . . aeration pump, 10 . . . U-shaped tube for discharging treated waste liquor.

DETAILED EXPLANATION OF THE INVENTION

The microorganism used in the present invention is a fungus of genus Auerobasidium capable of decomposing and assimilating a high concentration of phenol despite the presence or coexistence of high concentrations of methanol and formaldehyde. The inventors have found out that among such fungi, a fungus belonging to *Aureobasidium pullulans* isolated from a soil sample is most preferable. *Aureobasidium pullulans* used in the present invention is *Aureobasidium sp.* No. 14 (hereinafter, abbreviated as "the present fungus"). The present fungus has been deposited to Fermentation Research Institute Agency of Industrial Science and Technology, Ministry of International Trade and Industry (abbreviated as "FRI") on Aug. 23, 1977 with deposition No. 4197 (deposited on May 1, 1981, with international deposition No. FERM BP-1).

The present fungus is a microorganism belonging to *Fungi imperfecti*, but it shows dimorphism and propagates as yeast-like cells when subjected to liquid shaking culture, so that it can be said as a fungus having properties similar to those of yeast. The present fungus assimilates high concentrations of phenol and cresols. The present fungus can be pure-cultured on fibrous matrials owing to its fungus-like properties. After culturing, the present fungus assumes mold-fiber masses. The mold-fiber masses can be used for contact oxidation in the present invention.

In a preferred embodiment of the present invention, the present fungus is pure-cultured on a support such as fibrous or porous material etc. soaked with a pre-culture medium to obtain mold-supports masses as semi-immobilized state. The mold-supports masses are arranged in a treating tank set with a filling skeleton. A waste liquor containing phenol is charged continuously in the treating tank and aerated properly whereby phenol is oxidized, decomposed and assimilated. The inventors have found out also that the oxidative decomposition is effected even in the presence or coexistence of KCN, NaCN or KSCN and is not influenced by the presence thereof.

In another preferred embodiment of the present invention, the present fungus is pure-cultured on a fibrous or porous material soaked preliminarily with a sugar-containing medium to yield a large amount of cells and extracellular mucoidic polysaccharide pullulan to obtain mold-supports masses as semi-immobilized state while promoting adhesion of the present fungus to the supports by the adhesive property of the mucoid. Subsequently the mold-supports masses are transferred into a treating tank of a cylindrical column wherein a filling skeleton composed of a network structure consisting of randomly oriented synthetic resin fibers is positioned. Thereafter the tank is aerated to adhere the mold-supports masses to semi-immobilize them on the filling skeleton to oxidize, decompose and assimilate the phenol in the waste liquor.

The present invention does not use bacteria and is different from the activated sludge method wherein bacteria are generally used. The present invention uses a fungus having a cell size larger than bacterium and having a surface area comparatively larger than that expected from the increase of size, so that the present invention is much more advantageous than the activated sludge method.

The present fungus decomposes phenol sufficiently despite the coexistence of cyanide or thiocyanide, yet does not decompose them.

The present fungus has the following cultural characteristics.

Cultural characteristics

Potato dextrose agar: Slant culture Growth was somewhat retarded in this medium as compared to the two other media. Scanty filiform or echinulate colonies were seen along inoculated streak after 2 days at 30° C. Colonies were composed of yeasty mat, at first greenish-white, later becoming greenish-black or black; flat and a little raised, the margin being irregular. The mat was a little lustrous, mucoid and creamy. Occasionally very tiny, grey or olive green hyphal mycelia appeared especially underneath the slant. After 3 days the fungal growth increased becoming dark olive green to dark green. After 5 days the whole of the lower part of the slant was covered with floccose aerial hyphae; however the upper surface still had a black-yeasty colony, mainly along the inoculated streak. The reverse of the slant was greenish-black.

Potato dextrose agar: Giant colony Colony grew slower than that on the agar slant, attained a diameter of about 1.5–1.7 cm after 7 days at 30° C., and appeared raised or umbonate form. It was composed of a soft, slimy, black yeasty portion and a dark greenish-grey fungal portion. The latter was mainly floccose radiated from the center of the colony; the former was developed at the marginal part of the colony and was also sparsely scattered throughout the fungal part.

Malt extract agar: Slant culture Growth was abundant after 2 days at 30° C. and faster than on the potato dextrose agar slant. Olive green, echinulate, beaded or spreading colonies without luster grew along inoculated streak. They were a little raised, flat and yeasty mass mixed with aerial hyphae; such fungal growth were more abundant at the lower part of the slant. After 3 days the whole of the lower part of the slant was covered with olive green fungal mycelia. Incubation at 30° C. for 5 days gave rise to a more abundant growth of olive green hyphal mat, covering the slant surface from the bottom to the middle of the slant. At the top of the slant, floccose hyphae were elongated, being intertangled with black yeasty colonies along the inoculated streak. The reverse of the slant became greenish-black.

Malt extract agar: Giant colony Characteristics of these colonies were almost the same as those on potato dextrose agar: irregularly circular and of lobate or filamentous margin. The marginal black yeast portions were a little lustrous caused by the coexistence of scanty hyphae.

Malt extract-peptone-yeast extract agar:

Slant culture Shiny colonies similar to those on malt extract agar slant were formed at least within 2 days. However, these consisted of solely with slimy, creamy and yeast-like mass and no fungal mycelium could be seen at all; the reverse was deep black.

Physiological properties

The optimum pH for growth was 5.4–6.3, and the optimum temperature, 30°–35° C. The pH range was 2.9–8.9, and the range for temperature, 10°–45° C.

Microscopic morphology

By slide cluture and the usual microscopic preparations of the organism grown on malt extract agar or potato dextrose agar, the following morphological characteristics were observed.

Yeast-like cells. Under the microscope, cells in the yeasty colonies on agar culture were observed as ellipsoidal, fusoid, ovate or spherical single separate cells. Often chains or masses thereof by budding were also seen. Cells were light olive to green and hyaline, 1.5-×-4–10 μm in size.

Hyphae. From ground mass formed by such yeast-like cells, slender filamentous hyphae began to elongate as cultivation proceeded. They were hyaline and light olive to olive green, and had transverse septa without clamp connection. One cell in the hyphae was 1.5–2.5×20 μm or more in size. Young hyphae were thin-walled but maturing areas became dark-brown and thick-walled. Hyphal cells sometimes bore arthroconidial structure at the distal regions.

Conidia. Many undifferentiated conidiogenous cells were produced on hyphae laterally, terminally or intercalarily. Blastic conidia were formed simultaneously in dense groups. They were hyaline, light olive to olive green, smooth, one-celled rather variable in shape and size, but neither coiled nor branched. When sporulation was abundant they were produced all over the cell surface. Conidia arose directly as buds from vegetative hyphae, and no conidiophores, phialides or pegs could be seen. Often acropetalous conidial chains were present as a result of budding. Finally, conidia detached from hyphae, and proliferated as separate yeast cells.

Identification

Hyphae and conidia contained dark green pigment. Conidia were one-celled, and budded to form new conidia. Unlike Basidiomycete no clamp connections at mycelial septae and no forcibly discharged spores were observed. Setae were absent. Conidia or blast-spores were not produced on conidiophores, phialides, pegs or other special sporogenous cells but developed as buds directly from vegetative hyphae or previous spores, often forming acropetalous chains which were usually broken apart into separate spores; conidia were neither coiled nor branched. In older cultures dark-brown, thick-walled hyphae were formed. Stromata were absent.

On the basis of these findings the present fungus was assigned to *Aureobasidium pullulans* by comparing them with the description in G. C. Ainsworth "Dictionary of the Fungi" 6th edition from Commonwealth Mycological Institute (1971), H. L. Barnett & B. B. Hunter "Illustrated Genera of Imperfect Fungi" 3rd edition (1972) and report of Wm. B. Cooke "Mycopathologia" vol. 12, p. 1 (1959).

Concentration of o-, m- or p-cresol in a medium is preferably within a range of about 0.01–0.07%. If the concentration of phenol is about 0.2%, assimilation capability of the present fungus is lost sometimes. The present fungus can assimilate about 0.17% of phenol at the maximum. Further, the present fungus can oxidize, and decompose or assimilate various phenol-derivatives such as saligenine, o-, m- and p-hydroxybenzaldehyde, salicylic acid, 3-methylcatechol, 4-methylcatechol and catechcol at a concentration of about 0.01% or more in a medium.

Various enzyme activities in oxidizing and decomposing or assimilating various phenols which are exhibited by the present fungus belong mostly to those of the so-called induced enzymes. Therefore, in order to obtain a large amount of such strongly active cells for use, there are the following two ways.

One of them is to cultivate the present fungus in a large amount in a culture medium which contains the above phenols as carbon sources. In this case, the culture medium is added with other substances such as nitrogen source, inorganic substance, minor nutrient etc. which are selected optionally and properly from publicly known substances. Thus, as the nitrogen source, ammonium sulfate, ammonium nitrate or ammonium chloride are usable. As the inorganic matter, magnesium salt, calcium salt, phosphate, natrium salt, iron salt or manganese salt are usable. As the minor nutrient or substances containing minor nutrients, vitamins, yeast extract or corn steep liquor are usable. In this method, growth of the present fungus is retarded due to toxicity of phenol and a prolonged and a large scale of cultivation is necessary to obtain a large amount of active cells.

Therefore, another way is to cultivate the present fungus to a great amount in a culture medium suitable for its cell growth, and subsequently impart them the capability of assimilating phenols for respective purposes. Namely, the present fungus is cultivated at first to a large amount in a culture medium containing glucose, sucrose, waste molasses or the like material which are publicly known substances as usually suitable for cultivating fungi. Alternatively, the present fungus is cultivated at first in a natural culture medium which causes good growth of the present fungus, namely, a malt extract-peptone-yeast extract-containing culture medium, a malt extract-glucose-peptone-containing culture medium, a malt extract-containing culture medium or a potate-glucose-containing culture medium. Subsequently, the cultivated culture medium is subjected to centrifugal precipitation and the precipitated cells are washed, and the washed cells are suspended in the above synthetic culture medium containing the various phenols in respective concentrations as a carbon source to contact with the substrate by aeration or shaking for a short period.

By the above two ways, the present fungus having a remarkable assimilating capability or oxidizing and decomposing capability can be produced abundantly.

In order to cultivate the present fungus in the above-mentioned two ways, both have to be performed by shaking or aerated culturing at a temperature of about 20°–40° C., preferably about 30°–35° C., a pH value of about 3–9, preferably about 5.4–6.0 for about 2–10 days. Of course, it is possible to increase yield by feeding carbon sources or other nutrient sources.

Next, the present invention will be explained in more detail with reference to fundamental experiments wherein the present fungus is pure-cultured.

EXPERIMENT 1

In this experiment, a basic culture medium used is containing 0.5% of $NH_4NO_3$, 0.25% of $KH_2PO_4$, 0.1% of $MgSO_4.7H_2O$, 0.01% of NaCl, 10 mg/l of $FeCl_3.6H_2O$, 10 mg/l of $CaCl_2.2H_2O$ and 0.01% of yeast extract and adjusted to a pH value of 6.0. At first 300 μg/ml of phenol is added to the basic culture medium as a carbon source and then the present fungus is innoculated and subjected to shaking culture at 30° C. After 48 hours, 200 μg/ml of phenol is added and the shaking culture is continued. Each 300 μg/ml of phenol is added after 96, 144, 168, and 216 hours while continuing the shaking culture. Thus, feeding of phenol is effected using each 200 μg/ml or 300 μg/ml of phenol until a total of 1,700 μg/ml of phenol is added to the basic culture medium while continuing the shaking culture for 240–264 hours. Afterwards, the phenol in the culture medium is completely consumed and asimilated by the present fungus which shows excellent growth. The grown cells having a remarkable phenol assimilating capability is centrifuged and the collected cells are added again to a medium containing 1,000 μg/ml of phenol and subjected to shaking aeration to completely disappear the phenol after 12 hours.

EXPERIMENT 2

A basic culture medium is used having a same composition as that of Experiment 1, except that the following solution of minor inorganic salts is added only when pure water wherein minor inorganic salts are removed sufficiently by distillation and ion exchange resin is used.

Fifty mg% of $H_3BO_3$, 4 mg% of $CuSO_4.5H_2O$, 10 mg% of KI, 20 mg% of $FeCl_3.6H_2O$, 40 mg% of $MnSO_4$, 20 mg% of $Na_2MoO_4.2H_2O$ and 40 mg% of $ZnSO_4.7H_2O$.

Instead of phenol in Experiment 1, 100 μg/ml of o-cresol is added to the basic culture medium and 100 ml of it is charged in a 500 ml shaking flask.

Separately, in an inoculum culture medium consisting of 1.5% of malt extract, 0.5% of peptone and 0.01% of yeast extract, the present fungus is cultivated twice for each 24 hrs at 30° C. During the 48 hrs shaking culture is continued. The grown cells are collected by centrifugal precipitation and washed twice with sterilized physiological saline solution.

The cells of the present fungus thus obtained are inoculated to the above basic culture medium and subjected to shaking culture at 30° C. The cells grow assimilating o-cresol, and after 8 days an ADS 660 nm value of 58 by Fuji photoelectric photometer is obtained and o-cresol is decreased to a value of only 5.5 μg/ml by a measurement, showing that it has been substantially completely consumed.

The grown cells are collected and again inoculated to a basic culture medium containing o-cresol or its derivatives as shown in the succeeding experiments to find out that o-cresol or its derivatives is decomposed and removed promptly by the cells, showing their capability of assimilting or oxidizingly decomposing o-cresol or its derivatives.

EXPERIMENT 3

The basic culture medium same as that of Experiment 2 except that 200 μg/ml of p-cresol is used instead of o-cresol as a carbon source is added with the present fungus and subjected to shaking culture at 30° C. Abundant growth is obtained after 8 days assimilation of p-cresol, showing consumption of this carbon source in the medium.

The grown cells are collected and again inoculated to a basic culture medium containing p-cresol to find out that p-cresol is decomposed promptly by the cells as in the above Experiments.

EXPERIMENT 4

A basic culture medium having the same composition as that of Experiment 2 except that it contains 100 µg/ml of m-cresol instead of o-cresol as a carbon source is inoculated with the present fungus and subjected to shaking culture at 30° C. Abundant growth is obtained after 8 days assimilation of m-cresol, showing consumption of this carbon source in the medum.

The grown cells are collected and again inoculated to a basic culture medium containing m-cresol to find out that m-cresol is decomposed promptly by the cells as in the above Experiments.

EXPERIMENT 5

Each 100 ml of basic culture media same as that of Experiment 2 and wherein various concentrations of 90–668 µg/ml of o-cresol are used are charged in 500 ml shaking flasks.

To each basic culture medium is added the inoculum cells obtained in the same manner as in Experiment 2. Amount of the cells inoculated to the medium shows a turbidity of not over than 4 by ADS 660 nm. A value of turbidity of 130 by ADS 660 nm corresponds to a value 1.0 by OD (optical density). When shaking culture is effected at 30° C., the present fungus grows well assimilating o-cresol. Growth characteristic between the concentrations of the substrate and the growth of the present fungus is as follows. At a concentration of 90 µg/ml of o-cresol, the cell growth begins after about 2 days of induction period, and reaches to stationary growth phase after 8–10 days, showing consumption of o-cresol. At concentrations of 177–459 µg/ml, the cell growth enters in logarithmic growth phase after 4–5 days induction period and the cells grow progressively at a substantially same rate and reach to maximum growth amounts after 15–25 days. During such growth carbon source is consumed after 10–20 days. If the basic culture medium contains more high concentrations of o-cresol, the periods required for initiating cell growth are retarded. For example, in case of concentration of 668 µg/ml of o-cresol, amount of the cells is slowly increased decomposing gradually o-cresol during first 22 days after inoculation. When the concentration thus decreased to about 560 µg/ml, more vigorous growth begins in the same manner as in the case of concentration of below 459 µg/ml and finally o-cresol is completely consumed to reach maximum growth amounts. In such cases when the amount of inoculum cells is little or when the concentration of the cells adapted to o-cresol is low (namely, ADS 660 nm is not more than 4 in the former case, and ADS 660 nm is not more than 25 in the latter case), the concentration of o-cresol at which the present fungus can start prompt assimilation and growth is not more than about 560 µg/ml. However, as explained in the following Experiments, high concentrations of o-cresol can be decomposed and assimilated promptly, when the induced enzyme systems are preliminarily sufficiently formed and reacted with suspensions of high concentrations of the cells.

EXPERIMENT 6

As an example to cultivate the present fungus to a large amount at first and then impart the grown cells the capability of decomposing phenols, the present fungus is cultivated for 24 hours in four shake flasks each containing 100 ml of the culture medium containing malt extract, peptone and yeast extract same as that used in Experiment 2. The cells are collected and washed in a conventional manner, and are divided and suspended into three 2 l Elrenmyer flasks each containing 500 ml of a basic culture medium containing 100 µg/ml of o-cresol in the same manner as in the preceeding Experiments. Cultivation of the cells are continued for 7 days or more by a rotary shaker, while properly feeding thick solution of o-cresol having a concentration of 20 mg/ml.

The cells which already existed in a thick concentration of turbidity of 148 by ADS 660 nm in the basic culture medium at the initiation of the cultivation, acquires the capability of assimilating o-cresol and causes o-cresol to disappear promptly. About 100 µg/ml of o-cresol existed at first is disappeared almost completely after 20 hours. Afterwards, o-cresol is feeded 10 times, each time raising the concentration of o-cresol to about 150–220 µg/ml, and in each time o-cresol is decomposed at a rate of 6.5–7.6 µg/ml/hr and concentration of the cells is increased finally to a value of 258 by ADS 660 nm. At the final stage of feeding, a concentration of 114.5 µg/ml of o-cresol is decomposed at a rate of about 13 µg/ml/hr.

EXPERIMENT 7

Each 100 ml of inoculum culture medium of malt extract-peptone-yeast extract culture medium in Experiment 2 in three shaking flasks except that 3% of malt extract concentration is used instead of 1.5% (abridged as M.P.Y. culture medium) is employed for shaking cultivation at 30° C. for 48 hrs. The cultured solution is added to three 2 l Elrenmeyer flasks each containing 500 ml of M.P.Y. culture medium and subjected to rotary shaking cultivation for 24 hrs, and the three cultured solutions are further respectively mixed with each 500 ml of the same M.P.Y. medium in three another 2 l flasks and the contents of each flask are divided to two portions to obtain six 2 l Elrenmyer flasks containing 500 ml of M.P.Y. culture medium and cultivated for 24 hours. When the cultivation reaches to a turbidity value of 138–149 by ADS 660 nm, the cells are collected and inoculated and suspended in 3 l of a basic culture medium containing 100 µg/ml of o-cresol in a mini jar fermentor and cultivated under aeration and agitation in the conventional manner. Agitation is 500 rpm, aeration is 3 l/min and temperature is 30° C. Four times feedings are effected during the cultivation of 2.5 and 5/6 hours, concentration of o-cresol at each feeding time being adjusted to 168–324 µg/ml. For the first 2 hrs. o-cresol is decomposed at a rate of 0.35 µg/ml/min. However, afterwards, as the metabolic system in the suspended cells are inducively converted to an assimilation system of o-cresol, the rate is gradually increased. Thus, o-cresol is decomposed at exceedingly prompt rates of 0.79 µg/ml/min in a cultivation period of 18.5–21 and 5/6 hours, 1.08 µg/ml/min in a cultivation period of 22.5–24.5 hours and 1 µg/ml/min in a final cultivation period of 24.5–25 and 5/6 hours.

EXPERIMENT 8

In this experiment, a publicly known Warburg manometer is used to clarify a fact that the present fungus has a capability of oxidizing and decomposing phenol derivatives, cresol derivatives or catechol derivatives.

In a similar way as described in Experiment 2, the cells obtained by shaking cultivation in a culture medium containing o-cresol for 4 days are collected and washed in a conventional manner. Cell suspension is prepared to 3 mg dry weight/ml in 0.1 M-phosphate buffer of pH 7.0. Activity of the present fungus oxidizing several phenolic substrates is examined by using reaction mixture containing 2 ml of 0.05 M-phosphate buffer of pH 7.0, 3 mg dry weight of the cells and 2 $\mu$mol of the substrates employing a Warburg manometer. The results are shown in Table 1.

TABLE 1

| Substrate | Oxygen consumption ($\mu$mol $O_2$/$\mu$mol substrate/3 hrs.) |
|---|---|
| Saligenine | 3.5 |
| o-Hydroxybenzaldehyde | 2.2 |
| m-Hydroxybenzaldehyde | 4.7 |
| p-Hydroxybenzaldehyde | 3.7 |
| Salicylic acid | 1.7 |
| 3-Methylcatechol | 4.0 |
| 4-Methylcatechol | 2.5 |

In order to ascertain oxidizing activity of the present fungus against catechol, intact cells in the above 0.1 M-phosphate buffer of pH 7.0 are treated with a Brown cell homogenizer cooling by gaseous carbon dioxide and then centrifuged to prepare cell-free extract. Oxidizing activity of the present fungus against catechol is examined using a Warburg manometer and reaction mixture consisting of 2 ml of 0.05 M-phosphate buffer of pH 7.0 containing cell-free extract corresponding to 2 mg of protein and 2 $\mu$mol of catechol. As a result, oxygen consumption of 0.75 $\mu$mol $O_2$/$\mu$mol substrate/2 hrs is exhibited.

After measurement by the manometer, Folin color reaction which is a characteristic to the substrate in the reaction mixture is disappeared completely or decreased substantially.

From the results, it is observed that the present fungus has strong oxidizing and decomposing activities also of derivatives of phenol, cresol and catechol.

EXPERIMENT 9

A basic culture medium same as that of experiment 2 is added with 100 $\mu$g/ml of salicyclic acid as a carbon source and then inoculated with the present fungus and cultured shaking at 30° C. The present fungus reaches to maximum growth utilizing salicylic acid after 5 or 6 days. A value by ADS 660 nm is 24 at that time.

EXPERIMENT 10

A basic culture medium same as that of Experiment 2 is added with 300 $\mu$g/ml of p- or m-hydroxybenzoic acid as a carbon source and then inoculated with the present fungus and cultured shaking at 30° C. The present fungus exhibits an excellent maximum growth utilizing the substrate p- or m-hydroxybenzoic acid after 4–5 days. A value by ADS 660 nm is respectively 37 or 40 at that time.

Next, semi-immobilization of the present fungus by adhering it on a support will be explained in detail with reference to operation example.

Two gram of washed and dried fibrous material as the support for semi-immobilization is put in a 300 ml Erlenmyer flask equipped with a cotton stopper and the flask is autoclaved.

Ten ml of a M.P.Y. culture medium shown in the following Table 3 containing 0.1% of phenol is inoculated and cultured shaking at 30° C. for 2 days to obtain an inoculum culture.

The inoculum culture solution is introduced into a flask containing 2 g of fibrous support under aseptic condition and left for static-cultivation at 30° C. for 10 days. As the propagation of the present fungus proceeds, the fibrous support assumes black colour and the semi-immobilization of the fungal cells is achieved. As the fibrous support, glass wool, asbestos and the like inorganic fibers are usable. Various natural culture medium other than M.P.Y. culture medium can be used for pre-culture or semi-immobilization. Sugaric culture medium containing a large amount of glucose or sucrose and so on is more preferable because of the vigorous production of mucoidic polysaccharides.

An illustrative example of setting the fibrous support to which the present fungus is adhered (mold-supports mass) in a treating tank is as follows. As shown in attached FIG. 1, a filling skeleton 5 having a cylindrical network structure composed of randomly oriented synthetic resin fibers are placed in a treating tank 3 having a cylindrical column shape. On the top of the filling skeleton 5 is mounted with the semi-immobilized mold-supports masses. Sterilized 1 l of diluted (diluted to 10 times of the original concentration) M.P.Y. culture medium in the following Table 3 which contains 0.1% of phenol is charged in the treating tank 5 and is cultivated by overnight aeration. The cultivation can be effected at room temperature but preferably at 25°–35° C. Sterilization is not always necessary, however, a closed system is preferable. After cultivation for overnight, the fibrous supports assume black colour and the present fungus has been dispersed and adhered substantially all over the filling skeleton 5.

The structure of the treating tank itself is well known, so that detailed explanation thereof may be omitted herein. In FIG. 1, the referential numeral 1 is a reservoir tank for influent waste liquor, 2 is a peristaltic pump, 3 is a treating tank body, 4 is an inlet for introducing the waste liquor, 5 is a filling skeleton, 6 is an inlet for aeration, 7 is an outlet for discharging aerated air, 8 is an outlet for treated waste liquor, 9 is an aeration pump and 10 is a U-shaped tube for discharging treated waste liquor.

Figure 2:
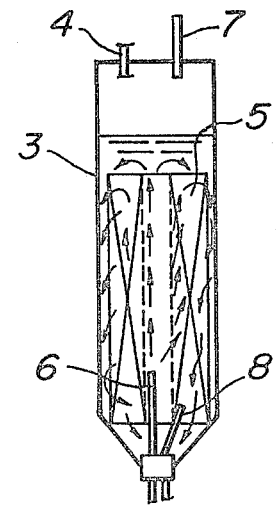
FIG. 2 is a schematic cross-sectional view of a treating tank illustrating flows of introduced air and waste liquor.

Liquid level in the treating tank 3 is maintained always constant by means of the peristaltic pump 2 and the U-shaped tube 10. Flows of air and waste liquor are as illustrated in FIG. 2.

According to the second aspect of the present invention, the present fungus oxidizes and decomposes waste liquors containing methanol and formaldehyde in addition to phenol. The present fungus can oxidize and decompose phenol in a concentration of about 3,000 ppm in a waste liquor at the maximum. Usually, the concentration of phenol in a waste liquor should not be over about 1,700 ppm, and a concentration of phenol not over about 1,200 ppm is preferable. The present fungus can decompose and assimilate methanol in a concentration of about 5% (50,000 ppm) in a waste liquor at the maximum. Usually, a methanol concentration not over about 20,000 ppm is preferable. The present fungus can decompose and assimilate formaldehyde in a concentration of about 200 ppm in a waste liquor at the maximum. Usually, a formaldehyde concentration not over about 150 ppm is preferable.

The present fungus is particularly suitable for treating a waste liquor issuing from phenol resin production plant, because it can treat a waste liquor wherein phenol, methanol and formaldehyde are coexistent as described above. From such plant, aromatic solvent such as benzene, toluene, xylene or the like which is used as a solvent for extracting phenol is often discharged in the waste liquor. Such organic solvents are usually toxic to bacterium in an ordinary activated sludge method. The present fungus advantageously decomposes and removes these organic solvents, too. Preferably, the concentration of the aromatic solvents in the waste liquor is about 200 ppm at the most.

The present fungus can advantageously decompose, assimilate and remove ethanol, glycerol, acetic acid, succinic acid, glucose, sucrose, naphthalene, acetaldehyde, propionaldehyde, benzaldehyde etc. in a waste liquor even when the waste liquor contains more than one of these compounds.

Experimental results of capability of the present fungus of decomposing various compounds as a carbon source are summarized in the following Table 2.

TABLE 2

Utilization of Different Carbon Sources by the Present Fungus

| Substrates or main carbon sources (%) added to culture medium | | Growth after 8 days | Time for stationary phase (day) | Specific growth rate $(hr^{-1})$ |
|---|---|---|---|---|
| None (culture medium only) | | ± | | |
| Phenol | (0.02) | + | 2 | 0.024 |
| | (0.04) | ++ | 3 | 0.024 |
| | (0.1) | +++ | 5 | 0.033 |
| o-Cresol | (0.02) | ++ | 5 | 0.026 |
| Ethanol | (0.02) | + | 1 | 0.088 |
| | (0.2) | +++ | 1 | 0.148 |
| | (2.0) | +++ | 2 | 0.161 |
| Glycerol | (0.02) | +++ | 1 | 0.155 |
| Methanol | (0.02) | + | * | |
| | (0.2) | + | * | |
| | (2.0) | + | * | |
| Acetic acid | (0.02) | + | 1 | 0.063 |
| | (0.1) | +++ | 5 | 0.218 |
| | (1.0) | − | | |
| Succinic acid | (0.6) | +++ | 2 | 0.143 |
| Glucose | (0.02) | ++ | 1 | 0.105 |
| Sucrose | (0.02) | +++ | 3 | 0.079 |
| Benzene | (0.02) | + | 2 | 0.037 |
| | (0.04) | ± | | |
| Toluene | (0.02) | + | 2 | 0.045 |
| | (0.04) | ± | | |
| Xylene | (0.02) | + | 2 | 0.034 |
| | (0.04) | ± | | |
| Naphthalene | (0.02) | ± | | |
| Formaldehyde | (0.01) | ± | | |
| Acetaldehyde | (0.02) | ± | | |
| Propionaldehyde | (0.1) | +++ | 4 | 0.063 |
| Benzaldehyde | (0.02) | ± | | |
| Salicylaldehyde | (0.02) | + | 7 | 0.023 |

Note:
*: Gradual growth
+++: $ADS_{660}$ unit > 111 or $OD_{660}$ >0.85
++: 61–110 or $OD_{660}$, 0.47–0.85
+: 26–60 or $OD_{660}$, 0.20–0.46
±: 16–25 or $OD_{660}$, 0.12–0.19
−: <15 or $OD_{660}$, <0.12
At 0 time, $ADS_{660}$ = 10 or $OD_{660}$ = 0.08

The present fungus can decompose and remove phenol in a concentration of 0.04% in a medium without being adversely influenced at all by indeed 4% of methanol, despite the coexistence of such high concentration of methanol. Simultaneously, the present fungus can remove methanol itself little by little.

The present fungus can decompose and remove phenol in a concentration of 0.04% in a medium almost without being adversely influenced by 50 ppm of formaldehyde, despite the coexistence of formaldehyde. Simultaneously, the present fungus can decompose and remove formaldehyde itself quite rapidly.

The present fungus can decompose and remove phenol in a concentration of 0.1% in a medium despite the coexistence of 80 ppm of formaldehyde, and can decompose and remove phenol in a concentration of 0.04% despite the coexistence of 150 ppm of formaldehyde.

Conditions for treating a waste liquor by the present fungus are as follows.

A temperature of within a range of about 20°–40° C., preferably about 30°–35° C.

A pH value of within a range of about 3–9, preferably about 5.4–6.0.

In a preferred embodiment of the present invention, the method of the present invention of treating a waste liquor containing methanol and formaldehyde in addition to phenol, comprises, a step of pure-culturing the present fungus of *Aureobasidium pullulans* capable of decomposing and assimilating a high concentration of phenol despite the coexistence of high concentrations of methanol and formaldehyde on a fibrous or porous supports soaked with a pre-culture medium to produce mold-supports masses, and a step of setting mold-supports masses on a filling skeleton in a treating apparatus for decomposing and assimilating phenol contained in a waste liquor and propagating mold-hyphal-supports masses under aeration.

In another preferred embodiment of the present invention, the method of the present invention of treating a waste liquor containing methanol and formaldehyde in addition to phenol, comprises, a step of adapting the present fungus of *Aureobasidium pullulans* capable of decomposing and assimilating a high concentration of phenol despite the coexistence of high concentrations of methanol and formaldehyde in the waste liquor and mixing the adapted present fungus and exposing the resultant mixture aerobically to decompose phenol.

Therefore, the present invention can be used in a two step cultivation method, a tank culturing method or an activated sludge method.

As a two step cultivation method, a method of treating a waste liquor wherein the present fungus is cultivated on fibrous or porous supports to form mold-supports masses, which are attached to a filling skeleton in a treating apparatus for decomposing the waste liquor as described previously is extremely effective.

Figure 14:
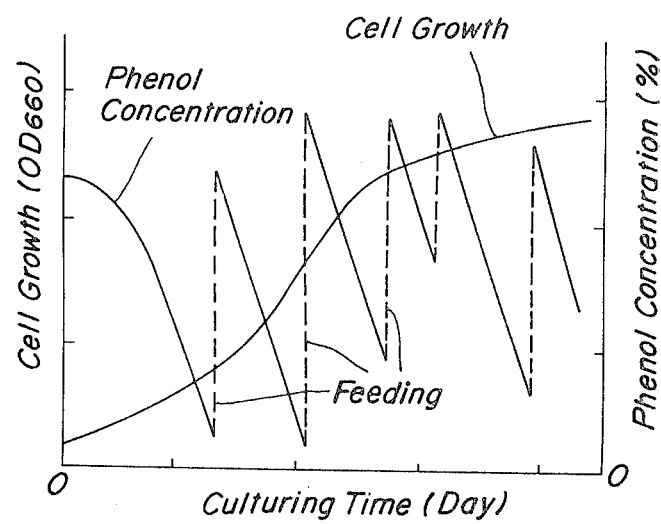
FIG. 14 is a graph showing a principle of a preferred embodiment in the present invention.

The present invention uses an induction enzyme in a fungus, and it can be practiced in an industrial scale. For example, the cells are adapted well in the above embodiment, so that the enzyme systems which oxidize, decompose and remove phenol, methanol, formaldehyde and other compounds are in an induced state. If the amount of the cells are larger, the faster the speed of removing these compounds is. This relation can be shown in dimension for example as μg of phenol removal ml/hour/mg cell, or mg of phenol removal l/hour/mg cell. Therefore, assuming that the amount of sludge and the like which are produced during the treating are not taken into account, it is preferable to treat a waste liquor with the cells in a high concentrations. FIG. 14 is a graph illustrating this principle.

As shown in FIG. 14, when the aeration amount, dissolved oxygen (abridged as "DO") amount etc. are constant, phenol-decreasing rate increases little by little to reach a constant level after a while. Amount of the cells increases also to reach a constant level. When both of the phenol decreasing rate and amount of the cells become constant, the system is stabilized, showing a maximum removal efficiency at the condition at that time.

In a culturing system wherein the aeration amount is increased depending on the amount of the cell, both the phenol decreasing rate and the amount of the cells increase to the chemicophysical limit.

Hereinafter, the present invention will be explained in more detail with reference to preferred embodiments which however should not be construed by any means as limitations of the scope of the present invention.

EXAMPLE 1

(1) Initiation of treatment

Artificial waste liquors as shown in the following Table 3 containing gradually increasing concentrations of phenol are used for determining the capability of treating the waste liquor by colorimetric measurements of concentrations of phenol in the influent artificial waste liquor and in the effluent treated waste liquor by Folin method. A peristaltic pump is used for charging the influent waste liquors. Treating capacity is measured by varying concentrations of phenol in the influent waste liquors and flow rates of the waste liquors. The apparatus used is the same as that shown in FIG. 1.

TABLE 3

| Compositions of Culture Media | | |
|---|---|---|
| M.P.Y. culture medium | Malt extract | 30 g |
| | Peptone | 5 g |
| | Yeast extract | 0.1 g |
| | Distilled water | 1000 ml |
| Artificial waste liquours containing phenol | $NH_4NO_3$ | 1.0 g |
| | $KH_2PO_4$ | 0.5 g |
| | $MgSO_4.7H_2O$ | 0.2 g |
| | NaCl | 0.02 g |
| | Yeast extract | 0.02 g |
| | Tap water | 1000 ml |
| | Phenol | variant |

(2) Method of quantitative analysis of phenol (Folin method).

Waste liquor samples containing 0–50 μg/ml of phenol . . . 0.2 ml 0.5 M-$Na_2CO_3$ aqueous solution . . . 1.0 ml Commercial Phenol Reagent (diluted two times) for phenol . . . 0.2 ml The above three are mixed and incubated at 40° C. for 20 min. and left stood to cool for 15 min. and are subsequently measured to determine its OD 660 nm.

Regression equation of standard curve.

Phenol (μg/ml) = $51.282 \times OD_{660} - 1.53$ (3) Results of the treatment and relating graphs.

Figure 3:
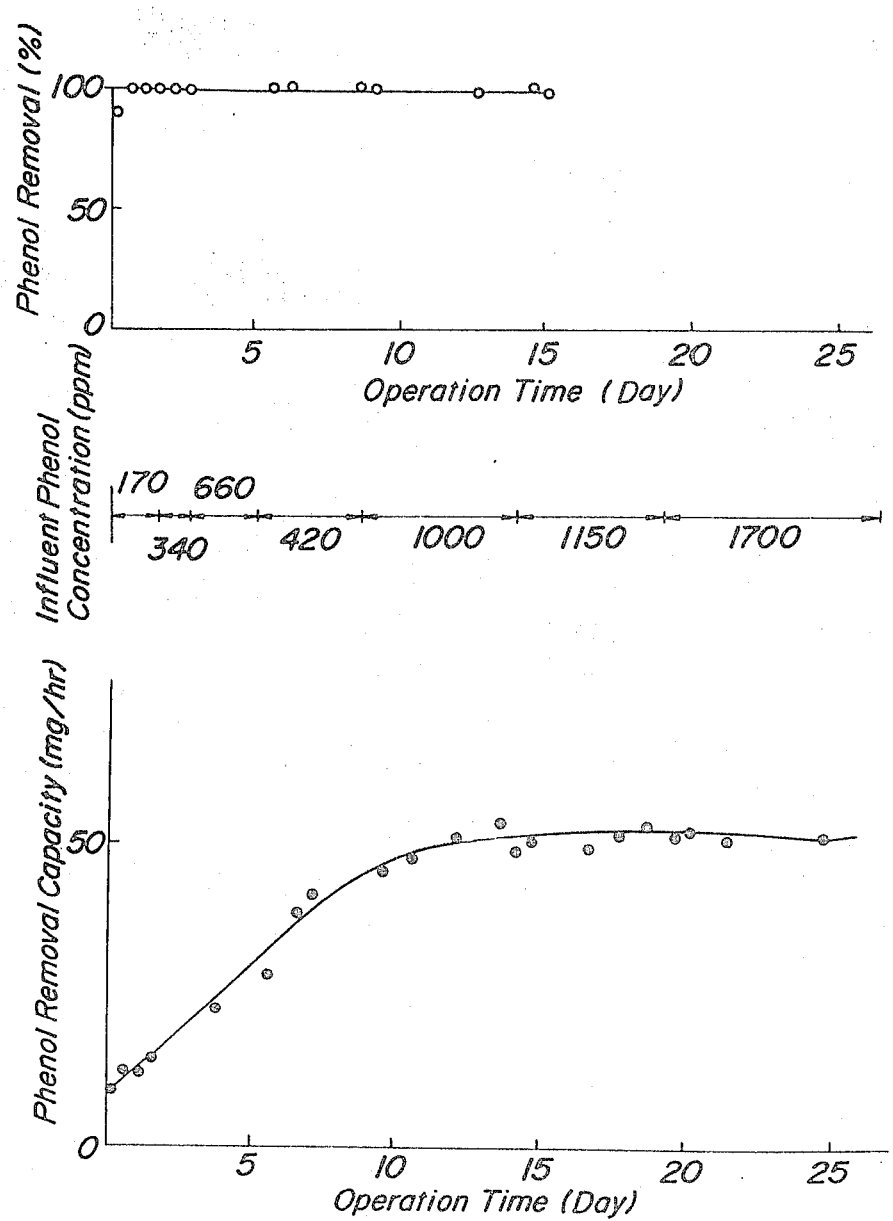
FIG. 3 is a characteristic graph showing relations between operation time and phenol removal, influent phenol concentration and phenol removal capacity.

Treating capability is stabilized about 10 days after the initiation of operation and a phenol removal capacity of 50 mg/hr is achieved at the phenol concentration of not more than 1,000 ppm, and a phenol removal capacity of 40–50 mg/hr can be seen even at a phenol concentration of 1,700 ppm (refer to FIG. 3).

Figure 4:
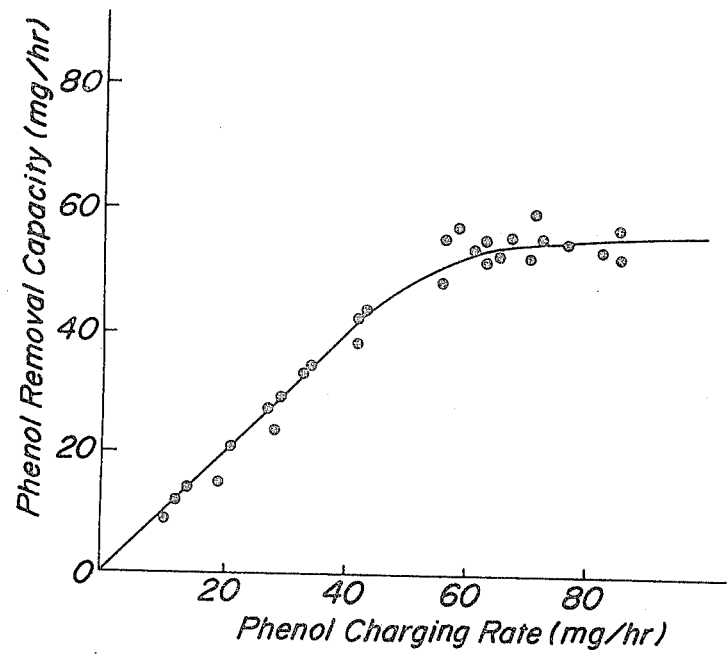
FIG. 4 is a characteristic graph showing a relation between phenol charging rate and phenol removal capacity.

A phenol removal capacity of 40–60 mg/hr can be achieved when the waste liquors contain 170–1,700 ppm of phenol (refer to FIG. 4).

Figure 5:
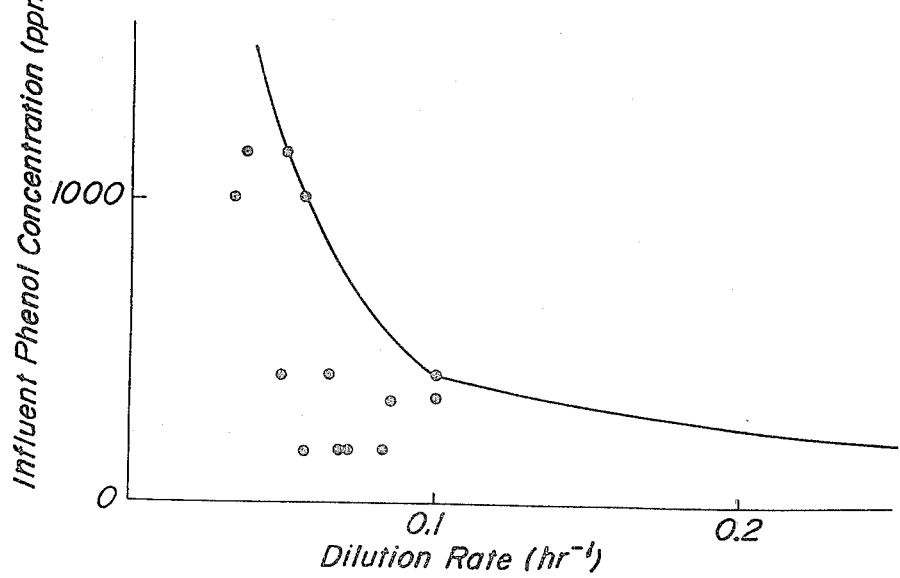
FIG. 5 is a characteristic graph showing a relation between influent phenol concentration and dilution rate for removing phenol by 70–100%.

At the phenol concentration of 1,200 ppm in the influent waste liquor, a dilution rate of 0.048 (equal to flow rate of 1 l/21 hrs) is possible. At the phenol concentration of 200 ppm in the influent waste liquor, a dilution rate of 0.25 (equal to flow rate of 1 l/4 hrs) is also possible (refer to FIG. 5).

Figure 6:
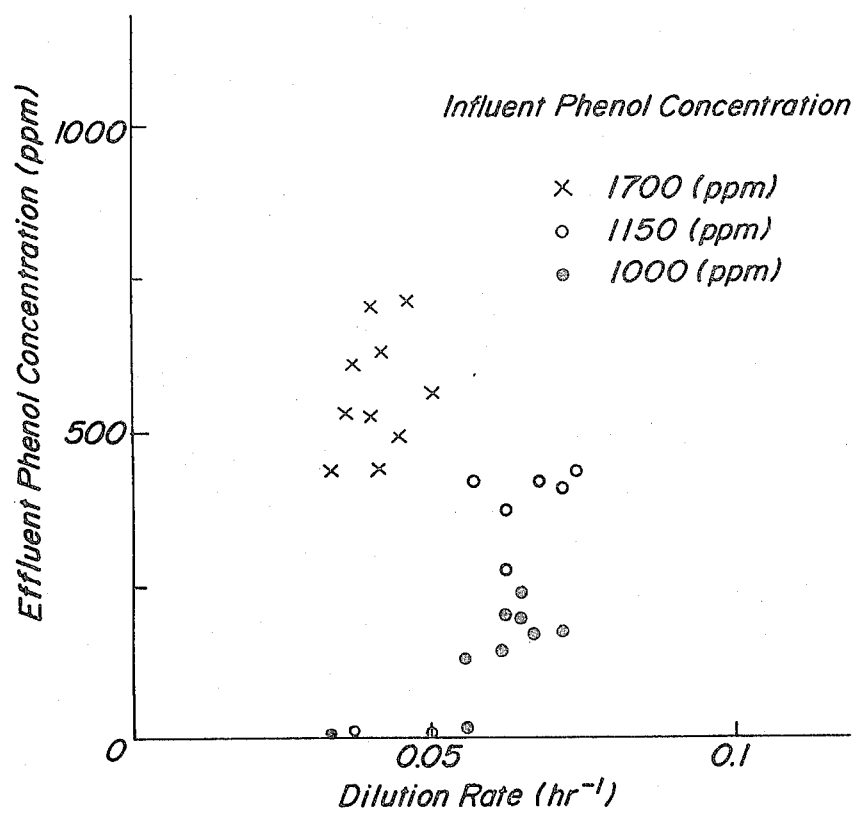
FIG. 6 is a characteristic graph showing a relation between dilution rate and effluent phenol concentration, taking influent phenol concentration as a parameter.

When the phenol concentration in the influent waste liquor is 1,000 ppm, 1,150 ppm or 1,700 ppm and the dilution rate is 0.05 (equal to flow rate of 1 l/20 hrs), phenol of a concentration of not less than 500 ppm remains only in case of 1,700 ppm phenol concentration, in the effluent waste liquor, indicating that removal capablity is insufficient (FIG. 6).

From the foregoing, it is possible in this experiment using the apparatus as shown in FIG. 1 to remove phenol at a rate of 50 mg/hr at the maximum phenol concentration of 1,200 ppm in the influent waste liquor and the dilution rate of 0.05 (equal to flow rate of 1 l/20 hrs). The term "dilution rate" used herein means a replacing rate of the culture solution per hour. Thus, dilution rate 1 in an 1 l apparatus means replacement of the culture solution at a rate of 1 l/hr.

(4) Regarding the growth of the present fungus in artificial phenolic waste liquors containing KCN, NaCN or KSCN.

Figure 7:
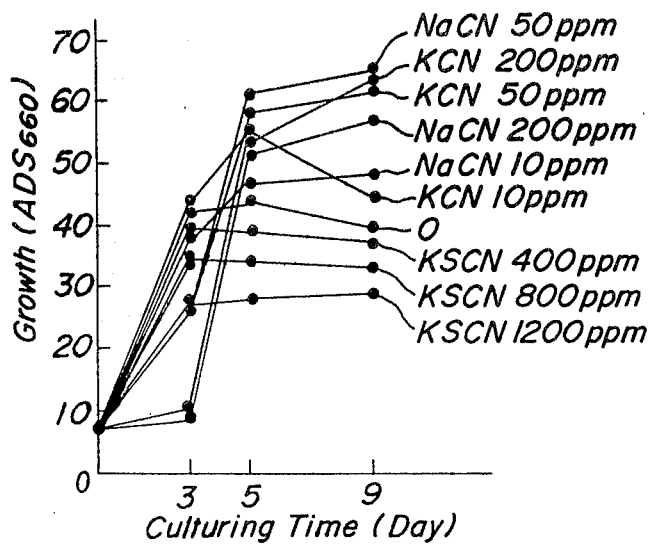
FIG. 7 is a characteristic graph showing the influence of various concentrations of KCN, NaCN and KSCN coexisting with 400 ppm of phenol upon the growth of the fungus in the present invention.
Figure 8:
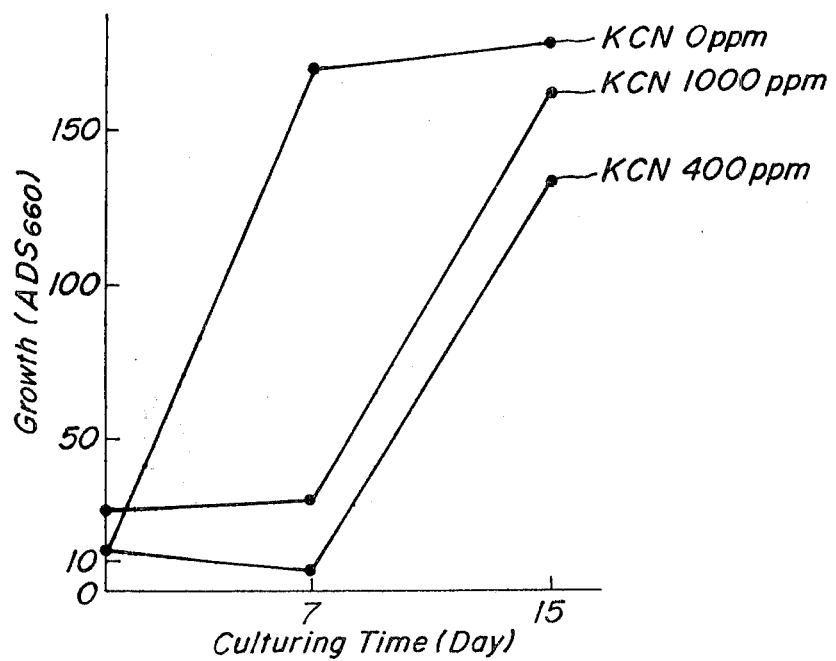
FIG. 8 is a characteristic graph showing the infuence of various concentrations of KCN coexisting with 1,000 ppm of phenol upon the growth of the fungus in the present invention.

We have found out as shown in FIG. 7 that, even if 200 ppm or less of KCN or NaCN, or 1,200 ppm or less of KSCN is coexistent with 400 ppm of phenol, the present fungus can grow utilizing phenol and thus usefully removing it from waste liquors wherein high concentrations of $CN^-$ or $SCN^-$ are coexistent such as from coal gas production industry or coke production industry.

EXAMPLE 2

A loopful cells from young slant culture is inoculated to 10 ml of the M.P.Y. medium shown in the above Table 3, and shake cultured shaking in a ϕ18 mm test tube at 30° C. for 24 hrs. Ten ml of the resultant suspension of the cells are washed two times with water, and subsequently inoculated to the following I culture medium wherein 0.04% of phenol is coexistent with various concentrations of methanol and the initial cell concentration is $OD_{660} = 0.08$. Growth of the cells, consumption of phenol as well as consumption of methanol are measured.

I culture medium used herein has the following composition.

Composition of I culture medium $NH_4NO_3$: 5.0 g $KH_2PO_4$: 2.5 g $MgSO_4.7H_2O$: 1.0 g NaCl: 0.1 g yeast extract: 0.1 g $FeCl_3.6H_2O$: 0.01 g $CaCl_2.2H_2O$: 0.01 g $H_3BO_3$: 0.5 mg $CuSO_4.5H_2O$: 0.04 mg KI: 0.1 mg $MnSO_4$: 0.4 mg $Na_2MoO_4.2H_2O$: 0.2 mg $ZnSO_4.7H_2O$: 0.4 mg Main carbon source: (a) phenol 400 mg, (b) methanol 0, 1, 10, 30 or 40 g.

Distilled water: 1,000 ml

Growth of the cells is determined by a photoelectric colorimeter as OD value at 660 nm.

Determination of phenol is effected by Folin method employed in Example 1.

Quantitative analyses of methanol are effected by a conventional gas chromatography.

Figure 9:
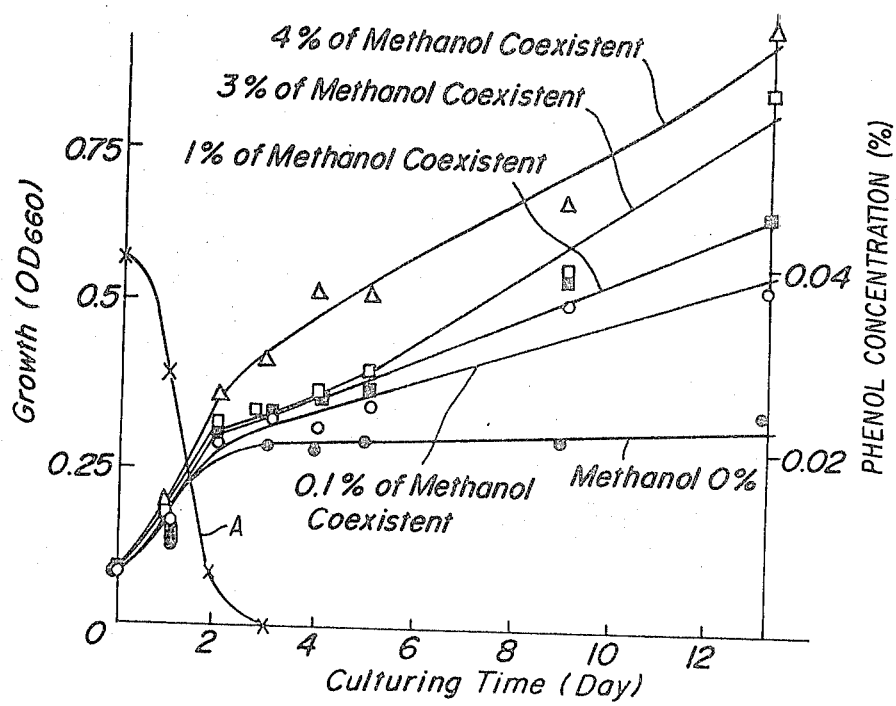
FIG. 9 is a characteristic graph showing a relation between culturing time, the growth of the fungus in the present invention and phenol concentration, taking initial coexisting methanol concentration as a parameter.
Figure 10:
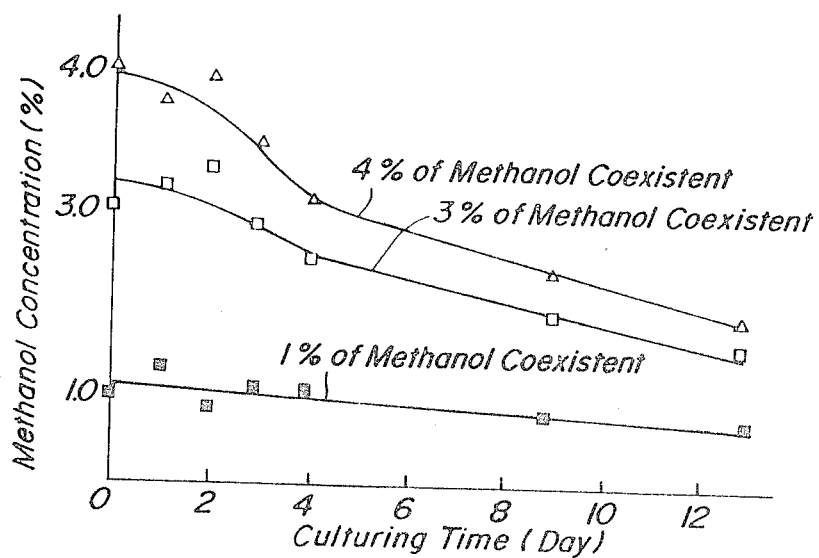
FIG. 10 is a characteristic graph showing a relation between culturing time and coexisting methanol concentration.

The results are shown in the attached FIGS. 9 and 10.

In FIG. 9 the curve A shows quantitative analytical results of phenol at a condition of coexistence of 4% of methanol. In all the case of various experimental conditions, phenols are consumed completely on the 3rd day and there is no differences between consumption rates of phenol.

FIG. 10 shows results of measurements of methanol consuming rate at various concentrations of methanol.

Figure 11:
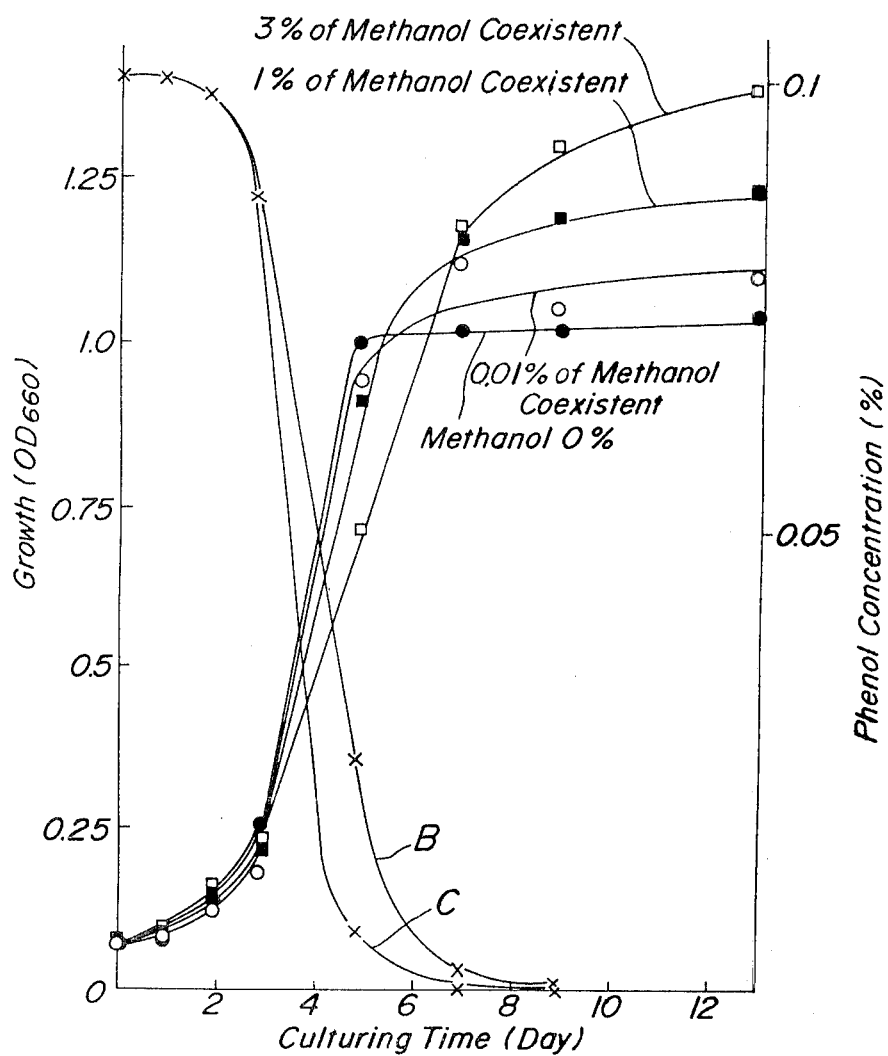
FIG. 11 is a characteristic graph showing a relation between culturing time, the growth of the fungus in the present invention and phenol concentration, taking initial coexisting methanol concentration as a parameter.

It can be seen from FIGS. 10 and 11 that phenol of a concentration of 0.04% is consumed at first and thereafter methanol is consumed gradually.

EXAMPLE 3

The procedures of Example 2 is repeated except that 0.1% of phenol concentration is used instead of 0.04%. The results are shown in attached FIG. 11.

In FIG. 11 the curves B and C are quantitative analytical results of phenol at conditions wherein coexistent methanol concentrations are 0% and 3% respectively.

It can be seen from FIG. 11 that methanol coexisting with 0.1% of phenol does not have substantial effect on consumption of phenol.

EXAMPLE 4

The procedures of Example 2 is repeated, except that formaldehyde is used instead of methanol. The initial cell concentration is at a value of $OD_{660}=0.05$.

Figure 12:
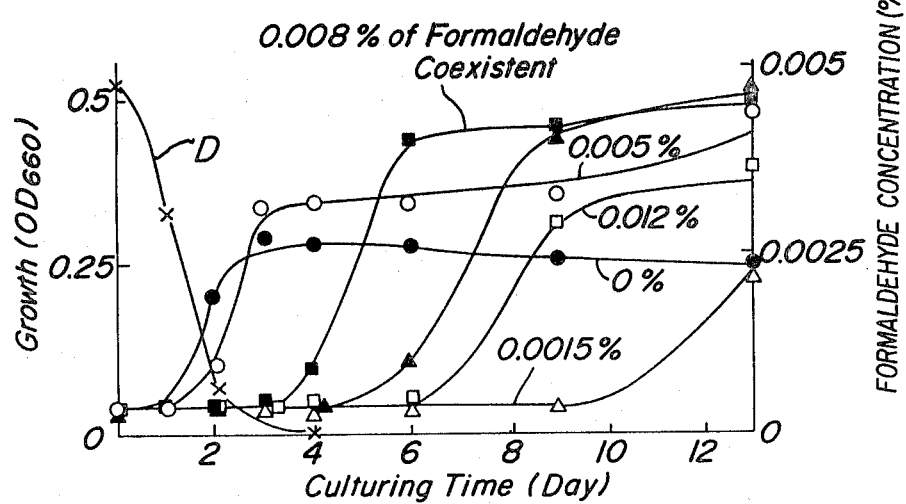
FIG. 12 is a characteristic graph showing a relation between culturing time, the growth of the fungus in the present invention and coexisting formaldehyde concentration, taking initial coexisting formaldehyde concentration as a parameter.

The results are shown in attached FIG. 12.

In FIG. 12 the curve D represents quantitative analytical results of formaldehyde at a condition of coexistence of 0.005% of formaldehyde. Analysis of formaldehyde is effected by chromotropic acid method described in the report of D. A. MacFadyen in Journal of Biological Chemistry, 158, p. 107 (1945).

It can be seen from FIG. 12 that the present fungus consumes formaldehyde at first and 0.04% of phenol subsequently.

EXAMPLE 5

The procedures of Example 4 is repeated, except that phenol concentration is 0.1% instead of 0.04%.

Figure 13:
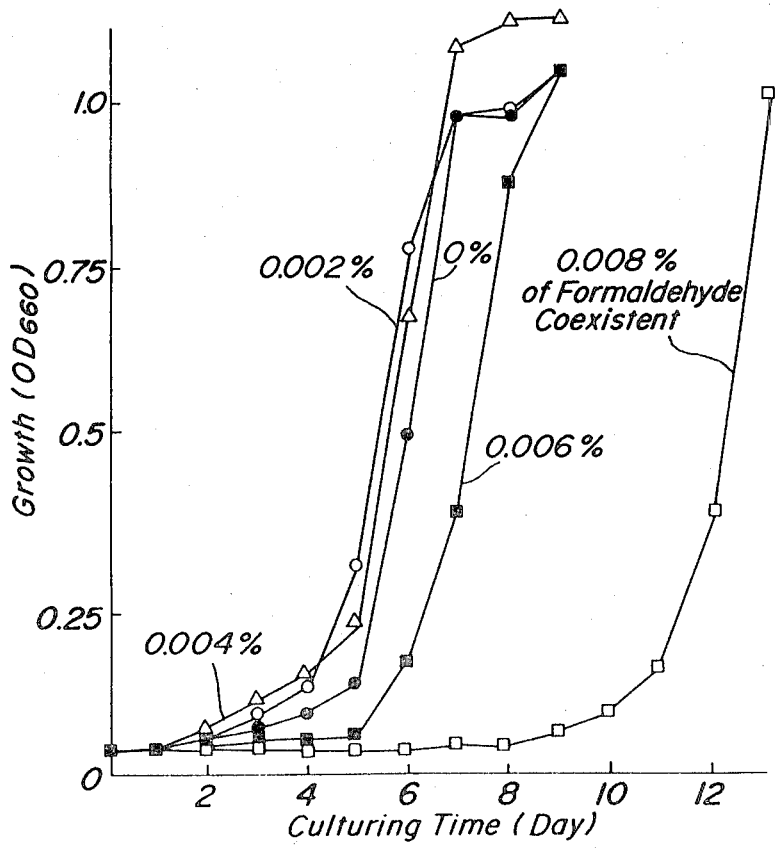
FIG. 13 is a characteristic graph showing a relation between culturing time and the growth of the fungus in the present invention, taking initial coexisting formaldehyde concentration as a parameter.

The results are shown in attached FIG. 13.

EXAMPLE 6

The procedures similar to Example 2 is repeated at a condition of coexistence of phenol, methanol and formaldehyde.

Figure 15:
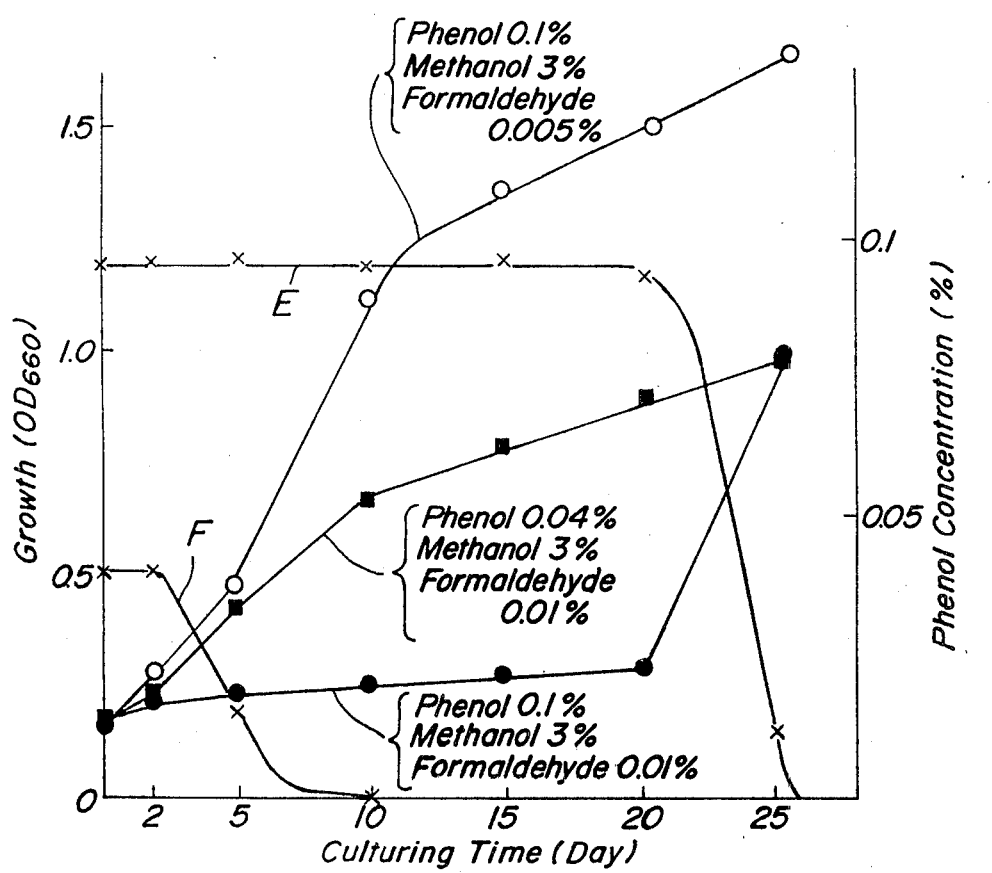
FIG. 15 is a characteristic graph showing a relation between culturing time, the growth of the fungus in the present invention and phenol concentration, when the three compounds phenol, methanol and formaldehyde are coexisting.

The results are shown in attached FIG. 15.

In FIG. 15 the curve E represents quantitative analytical results of phenol at a condition of coexistence of 0.1% of phenol, 3% of methanol and 0.01% of formaldehyde, and the curve F represents quantitative analytical results of phenol at a condition of coexistence of 0.04% of phenol, 3% of methanol and 0.01% of formaldehyde.

Functions and effects of the present fungus are summarized as follows:

(1) When grown, the present fungus forms budding spores or conidia on its side or distal end of hyphae, which discharge or disengage upon maturing to form yeast-like cells. The yeast-like cells thus formed are suspended in a waste liquor. These cells are in practice discharged with the effluent waste liquor, so that no trouble occurs that the treating tank is clogged due to the excessively grown yeast-like cells. Meanwhile, basic hyphae are adhered to the fibrous supports, so that they do not disengage from the fibrous supports at all.

(2) The present microorganism is classified as a fungus. In general, fungi have larger cells than ordinary bacteria, so that they have a good settling property and are easily separated in a sedimentation tank.

(3) As the present fungus grows, mold-supports masses assume black colour, so that operation can easily be examined by visual observation.

(4) The present fungus-supports masses can be attached to the filling skeleton of synthetic resin series, so that the cells are difficult to be dislodged.

(5) The present fungus can be cultivated on fibrous or porous supports, so that the cells can be grown quickly and produced industrially.

The present invention can achieve many following advantages by using the present microorganism which belongs to a fungus, Aureobasidium pullulans.

(1) High concentrations of phenol in a waste liquor can be removed without necessity of diluting the waste liquor substantially or at all.

(2) High concentrations of methanol in a waste liquor containing phenol can be endured and removed.

(3) High concentrations of formaldehyde in a waste liquor containing phenol can be endured and removed.

(4) Operation is comparatively easy and reaches quickly to a steady strate, so that stable operation can be performed.

(5) Amount of generated cells is about half as much of that by ordinary activated sludge method.

(6) Growth of the present fungus is not adversely influenced by the presence of KCN, NaCN or KSCN. This is presumably due to its strong tolerant property against such substances.

(7) Dilution is almost or completely unnecessary, so that the treating system including the treating tank can be constructed compactly.

(8) Cells are much larger than bacteria and their settling property is excellent, so that a agglutinant or the like is unnecessary.

(9) Expected synergistic effects of toxicities due to coexistence of phenol, methanol and formaldehyde can be endured, so that efficiency of decomposing and removing such compounds can be improved.

(10) Amount of water for diluting a waste liquor can be decreased.

(11) Apparatus for decomposing and removing the toxic compounds in a waste liquor can be constructed compactly.

(12) Chemicals, labor and time required for treating a waste liquor can be omitted or economized.

(13) Fluctuation of concentrations of the toxic compounds in an influent waste liquor can be endured or permissible.

(14) Waste liquors can be treated quickly and economically.

Thus, the present invention is excellently available in preventing environmental pollution and eminently useful industrially.

Although the present invention has been explained in detail with specific values and embodiments, it will of course be apparent to those skilled in the art that many variations and modifications are possible without departing from the broad aspect and scope of the present invention as defined in the appended claims.

What is claimed is:

1. A method of treating a waste liquor containing phenol, comprising:

pure-culturing a fungus of Aureobasidium sp. No. 14, FERM BP-1 on a support soaked with a preculture medium to produce mold-supports masses, said support being selected from the group consisting of fibrous materials and porous materials;

culturing the thus obtained mold-supports masses on said support in a waste liquor containing about 1,200 ppm or less of cyanide and about 3,000 ppm or less of phenol under aeration in a treating tank set with a filling skeleton having a network structure at a temperature of about 20°–40° C. and a pH of about 3–9;

decomposing and assimilating phenol in the waste liquor in said treating tank by the oxidizing activity of said fungus under aeration;

culturing said fungus in the waste liquor in the treating tank under aeration so as to produce a large mold-hyphal-supports masses; and removing the fungal cells from the treated waste liquor.

2. A method as defined in claim 1, wherein the pre-culture medium contains saccharides.

3. A method as defined in claim 1, wherein the filling skeleton is arranged in the treating tank, and the thus obtained mold-supports masses on said support are carried on the filling skeleton and said mold-supports masses are grown and propagated under aeration in said treating tank and the grown mold-hyphal-supports masses are supported by the filling skeleton.

4. A method as defined in claim 1, wherein said mold-supports masses on the support are carried on said filling skeleton.

5. A method as defined in claim 1, wherein said mold-supports masses on the support are carried on the top of the filling skeleton.

6. A method as defined in claim 1, wherein the waste liquor contains about 1,700 ppm or less of phenol.

7. A method as defined in claim 1, wherein the waste liquor contains about 1,200 ppm or less of phenol.

8. A method as defined in claim 1, wherein the culturing is effected at a temperature of about 30°–35° C.

9. A method as defined in claim 1, wherein the culturing is effected at a pH of 5.4–6.0.

10. A method of treating a waste liquor containing phenol, methanol and formaldehyde, comprising:

pure-culturing a fungus of Aureobasidium sp. No. 14, FERM BP-1 on a support soaked with a preculture medium to provide mold-supports masses, said support being selected from the group consisting of fibrous materials and porous materials;

culturing the thus obtained mold-supports masses on the support in a waste liquor containing about 1,200 ppm or less of cyanide and about 3,000 ppm or less of phenol, methanol and formaldehyde under aeration in a treating tank at a temperature of about 20°–40° C. and a pH of about 3–9;

decomposing and assimilating phenol, methanol and formaldehyde in the waste liquor in said treating tank by oxidizing activity of said fungus under aeration;

propagating the fungi in the waste liquor in the treating tank under aeration so as to produce a large mold-hyphal-supports masses; and removing easily the fungal cells from the treated waste liquor.

11. A method as defined in claim 10, wherein the waste liquor contains about 1,700 ppm or less of phenol.

12. A method as defined in claim 10, wherein the waste liquor contains about 1,200 ppm or less of phenol.

13. A method as defined in claim 10, wherein the waste liquor containing phenol contains about 50,000 ppm or less of methanol.

14. A method as defined in claim 10, wherein the waste liquor containing phenol contains about 20,000 ppm or less of methanol.

15. A method as defined in claim 10, wherein the waste liquor containing phenol contains about 200 ppm or less of formaldehyde.

16. A method as defined in claim 10, wherein the waste liquor containing phenol contains about 150 ppm or less of formaldehyde.

17. A method as defined in claim 10, wherein the waste liquor containing phenol contains at least one aromatic solvent used for extracting phenol, selected from the group consisting of benzene, toluene and xylene.

18. A method as defined in claim 10, wherein the waste liquor containing phenol contains about 200 ppm or less of the aromatic solvent.

19. A method as defined in claim 10, wherein the waste liquor containing phenol contains at least one compound selected from the group consisting of ethanol, glycerol, acetic acid, succinic acid, glucose, sucrose, naphthalene, acetaldehyde, propionaldehyde and benzaldehyde.

20. A method as defined in claim 10, wherein the mold-supports masses on the support supported on a filling skeleton in the treating tank are propagated under currency of flow of the waste liquor containing phenol, methanol and formaldehyde.

21. A method of treating a waste liquor containing phenol, comprising:

pure-culturing and assimilating a fungus of Aureobasidium sp. No. 14, FERM BP-1 on a support soaked with a pre-culture medium to produce mold-supports masses;

culturing the thus obtained mold-supports masses on the support in a waste liquor containing about 1,200 ppm or less of cyanide and about 3,000 ppm or less of phenol, methanol, and formaldehyde under aeration in a treating tank set with a filling skeleton at a temperature of about 20°–40° C. and a pH of about 3–9;

decomposing phenol, methanol and formaldehyde in the waste liquor in said treating tank by the oxidizing activity of said fungus under aeration;

propagating said fungus in the waste liquor in the treating tank under aeration so as to produce a large mold-hyphal-supports masses; and removing the fungal cells from the treated waste liquor.

22. A method as defined in claim 21, wherein the culturing is effected at a temperature of about 30°–35° C.

23. A method as defined in claim 21, wherein the culturing is effected at a pH of about 5.4–6.0.

* * * * *